T. C. KNOX.
Aerated Liquor Apparatus.

No. 206,025. Patented July 16, 1878.

WITNESSES:
Achilles Schehl.
C. Sedgwick

INVENTOR:
T. C. Knox
BY Munn & Co
ATTORNEYS.

UNITED STATES PATENT OFFICE.

THOMAS C. KNOX, OF NEW YORK, N. Y.

IMPROVEMENT IN AERATED-LIQUOR APPARATUS.

Specification forming part of Letters Patent No. 206,025, dated July 16, 1878; application filed June 13, 1878.

*To all whom it may concern:*

Be it known that I, THOMAS C. KNOX, M. D., of the city, county, and State of New York, have invented a new and useful Improvement in Aerated-Liquor Apparatus, of which the following is a specification:

My invention is particularly intended for use in connection with fountains, barrels, kegs, or other vessels containing ale, beer, or other aerated or carbonated liquors used as beverages, for the purpose of drawing the liquor for immediate consumption.

In drawing ale and some descriptions of beer, particularly certain kinds known as "root-beer," considerable delay is experienced by the liquid flowing very slowly in consequence of the great proportion of carbonic-acid gas contained therein. In order to avoid delay, it is the custom in some establishments to keep, in a measure or other vessel within convenient reach, a quantity of beer which has reached the state known as "still beer," having given off its carbonic-acid gas and ceased to effervesce, and when a quantity is to be drawn for a customer the glass or mug is first nearly filled with the still beer, and then completely filled by drawing live beer from the faucet communicating with the barrel or fountain.

The object of my invention is to provide for conveniently storing a sufficient quantity of still beer and protecting it from exposure, and also to provide for drawing it when desired.

The invention consists in a novel construction, arrangement, and combination of a coil of pipe, leading from the source of supply to the eduction-faucet, an ice tank or cooler through which said pipe passes, a tank or reservoir for storing the still beer, and a valve and faucets arranged in connection with said ice-tank and said reservoir, whereby provision is made for automatically drawing the beer and keeping it supplied to the reservoir, and for drawing both still beer and live beer, at the pleasure of the person in charge of the apparatus.

Figure 1:
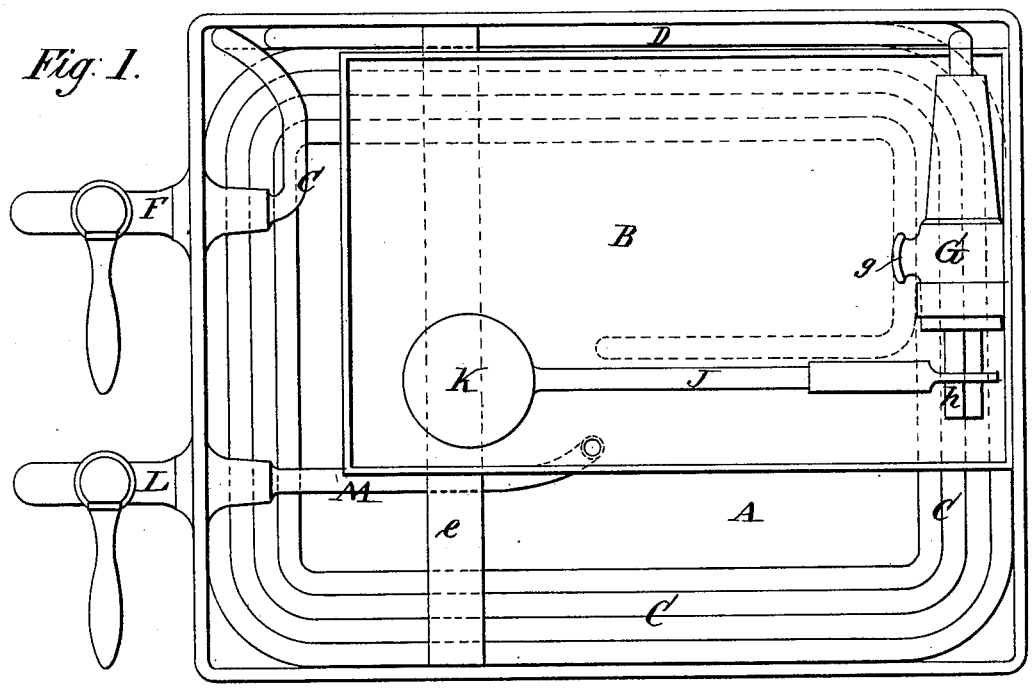
Figure 2:
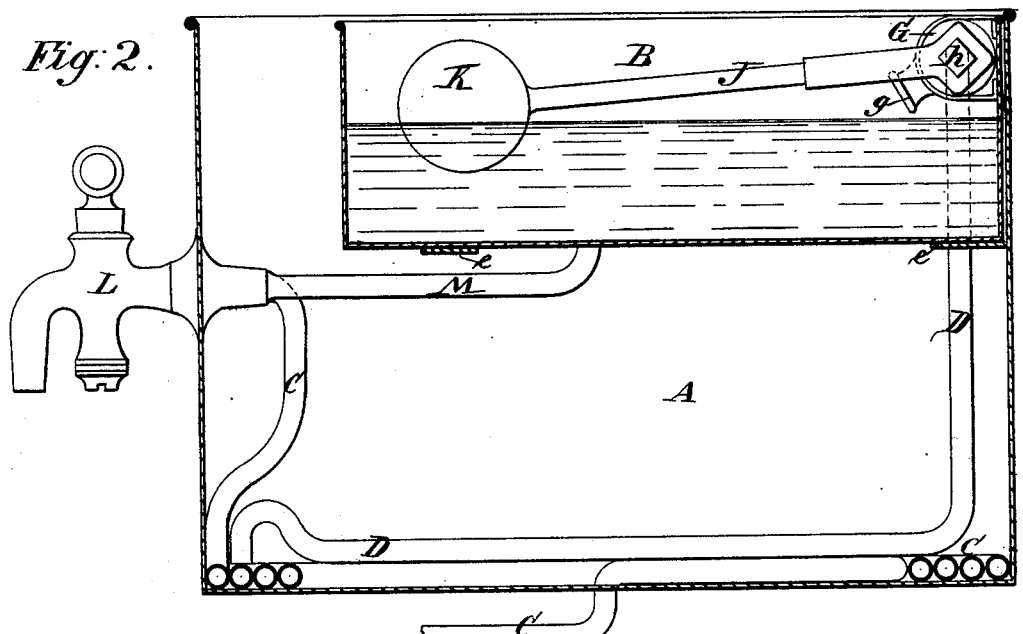

The accompanying drawing represents an apparatus embodying my improvements, Figure 1 being a top view, and Fig. 2 a longitudinal vertical section.

Similar letters of reference indicate corresponding parts.

The ice tank or cooler A may be of any suitable shape and dimensions, and is preferably of metal or lined with metal. In this tank lies a coil of pipe, C, leading from the fountain or barrel, and terminating at a faucet, E, which projects from the outside of the tank. The coil C enters the tank at the bottom thereof, and may be given any desired number of turns before reaching the faucet F. In the upper part of the tank A is located a smaller tank or reservoir, B, which may be attached and held in place by any suitable means. It is here shown as supported by strips *e* attached to the tank. A pipe, D, branches off from the coil C at any suitable point within the tank and passes up into the reservoir B, where it is provided with an automatic valve of some suitable description. In some cases a float-valve may be preferred. The drawing represents a form of float-valve which may be advantageously employed, consisting of a two-way valve, G, having attached to its stem *h* one end of an arm, J, the other end of which carries a float, K. From the bottom of the tank B a pipe, M, leads to a faucet, L, which projects from the outside of the tank, near the faucet F.

The apparatus operates as follows: The beer flows from the barrel or fountain, through the coil C and the branch pipe D, to the reservoir B, into which it escapes through the bib or spout *g* of the valve G. As the beer rises in the reservoir B the float K also rises, and turns the stem or shank *h*, so as to close the valve G and shut off the flow of beer into the reservoir. The beer in said reservoir soon gives off its carbonic acid and ceases to effervesce, and becomes what is called "still beer."

When a quantity of beer is to be drawn the still beer is drawn from the reservoir B, and when a sufficient quantity of still beer is obtained the live beer to complete the entire quantity is drawn direct from the coil C. As the still beer is drawn from the reservoir B the float K descends and opens the valve G, so as to allow more beer to flow therein from the fountain or barrel until it rises high enough to cause the float K to again close the valve. By this means the beer is automatically supplied to the reservoir B, and a sufficient quantity is constantly stored therein.

If desired, instead of the two faucets F and L, a three-way cock or faucet may be arranged to communicate with the coil C and pipe D, and thus the same faucet may be used for drawing still beer and live beer.

Having thus described my invention, what I claim as new, and desire to secure by Letters Patent, is—

In combination with a pipe or coil of pipe leading from the source of supply to the eduction-faucet, a tank or reservoir provided with an automatic and self-regulating valve, communicating with said pipe or coil, for supplying said reservoir from said source, substantially as and for the purpose herein described.

THOMAS C. KNOX.

Witnesses:
  C. SEDGWICK,
  E. R. BROWN.